United States Patent [19]

Lindner

[11] Patent Number: 4,474,913

[45] Date of Patent: Oct. 2, 1984

[54] POLYVINYLCHLORIDE PROCESSING

[75] Inventor: Robert A. Lindner, Weehawken, N.J.

[73] Assignee: Henkel Corporation, Minneapolis, Minn.

[21] Appl. No.: 484,743

[22] Filed: Apr. 14, 1983

[51] Int. Cl.³ ............................................... C08K 5/34
[52] U.S. Cl. .................................... 524/100; 264/300; 524/318; 524/567
[58] Field of Search ..................... 524/100, 318, 567; 264/300

[56] References Cited

U.S. PATENT DOCUMENTS

| | | | |
|---|---|---|---|
| 3,496,136 | 2/1970 | Susi et al. | 524/100 |
| 3,714,114 | 1/1973 | Stretanski | 524/100 |
| 4,332,702 | 6/1982 | Lindner | 524/178 |

Primary Examiner—Joseph L. Schofer
Assistant Examiner—T. M. Reddick
Attorney, Agent, or Firm—Patrick J. Span; Ernest G. Szoke

[57] ABSTRACT

The present invention describes an advantageous way of lubricating polyvinylchloride during an extrusion process.

12 Claims, No Drawings

POLYVINYLCHLORIDE PROCESSING

BACKGROUND OF THE INVENTION

1. Field of the Invention

This invention relates to the processing of plastic materials.

2. Description of the Art Practices

It is known that polyvinylchloride may be prepared through an extrusion process to form useful articles such as combs, spoons, siding, window frames, moldings, pipes, tubing and many other useful items. The polyvinylchloride is prepared in the form of a shaped article by mixing the polyvinylchloride, applying sufficient heat and/or mechanical pressure to transform the granular or powdered form of the polyvinylchloride into a plastic state. The polyvinylchloride in the plastic state is then fed through an extruder which is basically described as a screw device which recieves the pulverant polyvinylchloride resin and such other necessary ingredients, and forces the resin through an orifice thereby forming the article.

It is known from the author's earlier U.S. Pat. No. 4,332,702, issued June 1, 1982 that partial esters of pentaerythritol may be used as a lubricant in processing polyvinylchloride. It is also known from U.S. Pat. No. 4,336,176, issued June 22, 1982 to the author that it is desirable to include organo-tin compounds and the aforementioned partial ester of pentaerythritol to obtain a stabilization effect in a polyvinylchloride shaped article.

It is currently known in the art that ethylene bis stearamid may be used as a lubricant, which when mixed with polyvinylchloride resin prior to extrusion will coat the extrusion device so that the polyvinylchloride does not adhere to the surfaces of the extruder. Ethylene bis stearamide has been found unsuitable in certain regards inasmuch as it is subject to degradation. The degradation is believed to occur at the amide linkage. During the degradation of ethylene bis stearamide it is theorized that the polyvinylchloride is damaged through the removal of chlorine molecule by the decomposing amide. The loss of the chlorine results in a rearrangement of the bond structure of the polyvinylchloride giving rise to unsaturation at the site where the chlorine atom was removed. The unsaturation leads to instability of the resin from sunlight.

Ethylene bis stearamide is believed to function in this mechanism as a reactant material; therefore the increased use of the amounts of the amide leads to further degradation of the polyvinylchloride. Unfortunately, for many applications ethylene bis stearamide is an unsuitable lubricant as the amount of that material which must be used is sufficient to damage the polyvinylchloride article in a short period of time. Polyethylene lubricants have been used in place of amide lubricant but are not as fully accepted as the amides.

Throughout the specification and claims, percentages and ratios are by weight and temperatures are in degrees Celsius. To the extent applicable, the foregoing references are herein incorporated by reference.

SUMMARY OF THE INVENTION

The present invention describes a process for preparing shaped articles of polyvinylchloride including the steps of:

(a) obtaining polyvinylchloride in an unshaped form;

(b) mixing into component (a) a sufficient amount of

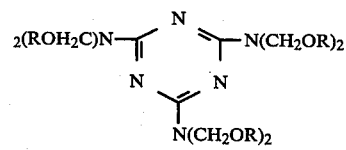

where R is from 6 to 32 carbon atoms to lubricate the polyvinylchloride;

(c) passing the mixture of (a) and (b) through an extrusion die; and, (d) obtaining the shaped article from the die.

A further embodiment of the present invention is a polyvinylchloride composition comprising:

(a) polyvinylchloride in an unshaped form; and, (b)

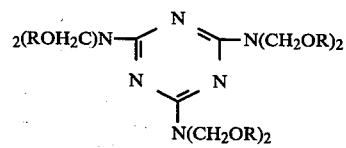

where R is from 6 to 32 carbon atoms.

DETAILED DESCRIPTION OF THE INVENTION

The main ingredient of the present invention is polyvinylchloride. Polyvinylchloride (PVC) comes in many different forms which are suitable for extrusion particularily as a pulverant (powder) material. Most of the forms of polyvinylchloride will be useful in the present invention as the processing in the extrusion die is such that the polyvinylchloride assumes a molten or plastic state and therefore any product differentiation of the polyvinylchloride is minimized.

The second aspect of the present invention is a melamine derivative compound of the general structural formula shown in the Summary.

In the formula for the melamine compound, R is an organic moiety preferably having from about 6 to about 32 carbon atoms; most preferable from about 12 to about 20 carbon atoms. R is most preferably a saturated unbranched moiety such as a cetyl ($C_{16}$) or stearyl ($C_{18}$) residue or mixture thereof.

The ratio of the melamine material (component b) to the polyvinylchloride is preferably from about 1/10,000:1 to about 1/100:1, most preferably from about 15/10,000:1 to about 1/200:1. It has also been found particularly advantageous in the present invention to use a blend of lubricants such that component (b) is utilized with a saturated fatty acid-fatty alcohol ester wherein both the fatty portions of the ester desirably are the same and have a carbon chain length range of from 12 to 20 in each of the fatty groups. It is most preferred that the fatty groups each have from 14 to 18 carbon atoms in the structure of the ester. Desirably the ester is a mixture of cetyl, myristyl, and stearyl stearates and palmitates. The level of use of the fatty acid-fatty alcohol ester with regard to the component (b) is from about 10:1 to about 1:4; preferably from about 8:1 to about 1:2.

As previously described briefly in the Summary and the Background of the Invention the polyvinylchloride is intimately mixed with component (b) and thereafter is fed into an extruder. Typically an extruder allows for the feeding of low density polyvinylchloride into a screw. The screw compresses the PVC to a molten state which is capable of being extruded. The molten PVC is then passed through a die to form the extruded article. It is within the screw and die that the lubricating effect of component (b) is most required.

Component (b) has been found to be an excellent external lubricant such that the screw and die do not become fouled with the polyvinylchloride for substantially longer periods of time than state of the art compositions designed for the same purpose.

The lubricant (b) helps the PVC flow through the extruder by reducing friction between the PVC globules during the melting stage. The mixing of the PVC and component (b) is conveniently prior to feeding to the extruder. The mixing is by any convenient method including those known in the art.

The extruder is conveniently operated on the basis of compressing the polyvinylchloride from a volume of 3:1 to about 2:1. Several additional ingredients may be included with the polyvinylchloride prior to introduction into the extruder. For instance, it is desirable to use calcium carbonate as filler in a polyvinylchloride composition. Co-stablizers and lubricants such as calcium stearate or other soaps may be employed. As previously noted, a desirable combination within the scope of the present invention is the inclusion of a fatty acid-fatty alcohol ester as an additional internal lubricant.

The extruder gives an interesting time and pressure profile. For detailed studies, a Brabender test apparatus may be used to determine the profile as well as temperature and work input. The torque at fusion measurement is that torque sufficient to bring the polyvinylchloride to a molten state. It will first be observed when ploting torque (viscosity) against time that the original free flowing powder moves very easily when torque is applied with a slight torque rise as the PVC fills the screw. The torque drops after the particles orient in the screw as the pulverant PVC moves toward the compression zone of the extruder.

After a period of time, the work input causes the powder to form particles having a molten character on the outer surfaces. The viscosity rises rapidly to the fusion point. The fusion point is defined as the time when substantially all of the polyvinylchloride has entered into the plastic state. Thereafter, a further input of energy raises the temperature and again lowers the viscosity of the polyvinylchloride as it becomes homogenous. As a correlation, the longer that it takes the polyvinylchloride to reach the fusion point, the more effective the lubricant. The viscosity drops off after the fusion point as the homogenous plastic mass flows easily in the molten state.

The components of the present inventions are known as incompatible lubricants in a polyvinylchloride system and by such definition it is meant that component (b) exudes to the surface of the extruder thereby allowing the article to be extruded with less sticking. Therefore, the excellent external lubricating effect is of great value in that the die is not fouled and the PVC is lubricated to the molten stage effectively.

The following are suggested embodiments of the present invention:

EXAMPLE I

A shaped polyvinylchloride article is manufactured according to the present invention by combining the following ingredients shown in Table I and thereafter extruding the mixture through a conventional apparatus for the formation of polyvinylchloride articles. B, C, D and E are within the present invention while A and F are comparative examples.

TABLE I

|   | A | B | C | D | E | F |
|---|---|---|---|---|---|---|
| DIAMOND 450 A polyvinylchloride available from the Diamond Shamrock Company. | 100.0 | 100.0 | 100.0 | 100.0 | 100.0 | 100.0 |
| KM323B Impact modifying acrylic resin available from Rohm & Haas. | 5.0 | 5.0 | 5.0 | 5.0 | 5.0 | 5.0 |
| K120N Processing aid which is an acrylic resin available from Rohm & Haas. | .5 | .5 | .5 | .5 | .5 | .5 |
| OMYA 90T A calcium carbonate filler available from Pleuss-Stauffer. | 3.0 | 3.0 | 3.0 | 3.0 | 3.0 | 3.0 |
| $TiO_2$ Titanium Dioxide - Pigment. | 10.0 | 10.0 | 10.0 | 10.0 | 10.0 | 10.0 |
| Thermolite 31 Super An organic base tin stabilizing compound. | 2.0 | 2.0 | 2.0 | 2.0 | 2.0 | 2.0 |
| Calcium Stearate A co-stabilizer and lubricant. | .8 | .8 | .8 | .8 | .8 | .8 |
| Acrowax "C" An ethylene bis stearamide available from Glyco Chemical Company. | .8 | 0 | 0 | 0 | 0 | 0 |
| MF 200 A melamine hexamethyl ether product according to the present invention available from the Henkel Corporation where R is equal to stearyl. | 0 | .16 | .4 | .12 | .3 | 0 |
| LOXIOL G30 A mixture of cetyl stearate | 0 | .64 | .4 | .48 | .3 | 0 |

TABLE I-continued

|  | A | B | C | D | E | F |
|---|---|---|---|---|---|---|
| and stearol stearate. | | | | | | |
| MOREFLAKE 160 | .6 | .6 | .6 | .6 | .8 | .6 |
| A parrafin wax having a melt point of 160° F. (71° C.). | | | | | | |
| ADVAWAX 280 | 0 | 0 | 0 | 0 | 0 | .8 |
| An ethylene bis stearamide available from Thiokol. | | | | | | |

The results of the examples given above of which B through E are of the present invention are reported in Table II below

TABLE II

FORMULATIONS

|  | A | B | C | D | E | F |
|---|---|---|---|---|---|---|
| BRABENDER STABILITY TIME AT 190° C. AT 60 rpm | 21.5 | 34 | — | 25 | — | 25 |
| FUSION TIME 190° C. 60 rmp | 1.2 | 4.4 | — | 1.2 | — | 1.1 |
| TORQUE AT FUSION | 2950 | 1850 | — | 2350 | — | 2800 |
| TORQUE AFTER 10 MINUTES | 2300 | 2150 | — | 1950 | — | 2250 |
| BRABENDER FUSION TIME 1° C. 30 rpm | | | | | | |

The stability time is that time at which the PVC in the test device begins to degrade to a set color point. The longer the stability time interval, the more the lubricant has reduced friction and heat build-up (i.e. greater lubricant effect). The products of the present invention are highly color stable and require only small levels of the lubricant.

The fusion time shows the effect of the lubricant at a given level on preventing the pulverant PVC from fusing. A high fusion time indicates effective lubrication at lower use levels of the lubricant. It is eventually necessary that the PVC reach a fused state at which point the PVC is present in a molecular form. Fusion may be achieved by adding heat energy or extending the extrusion step. Examples C and E made according to the present invention contained sufficient lubricant such that fusion of the product did not take place during the test.

Torque at fusion and 10 minute torque shows the effectiveness of the lubricant at these times. The fusion time during the processing of polyvinylchloride is critical. That is, the polyvinylchloride enters the extruder in a powder state and is eventually compressed into a molten state. In theory, the molten state should occur as near as possible between the middle and the die end of the extruder. The point here is, that if any of the polyvinylchloride is not in a homogenous molten state as it is extruded, then the product will be weakened by having a particulate nature thereby causing weak spots within the article. Where the PVC melts too quickly in the extruder a greater torque is required to move the molten mass to the die end of the extruder. The earlier the fusion point in the extruder, the more lubricant (or a more effective lubricant) is required. Similarly, if the fusion of the polyvinylchloride occurs to early in the screw then over-heating of the polyvinylchloride will be observed and degradation is increased.

EXAMPLE II

A polyvinylchloride product is prepared as indicated by mixing the ingredients and passing the mixture through an extruder.

|  | A | B | C |
|---|---|---|---|
| DIAMOND 450 | 100.0 | 100.0 | 100.0 |
| KM 323B | 5.0 | 5.0 | 5.0 |
| K 120N | .5 | .5 | .5 |
| OMYA 90t | 3.0 | 3.0 | 3.0 |
| TiO$_2$ | 10.0 | 10.0 | 10.0 |
| THERMOLITE 31-super | 2.0 | 2.0 | 2.0 |
| Ca stearate | .8 | .8 | .8 |
| MOREFLAKE 160 | .6 | .6 | .6 |
| AEROWAX "C" | .8 | — | — |
| POLYETHYLENE PA 190 | — | .16 | — |
| LOXIOL G-30 | — | .64 | .64 |
| MF-200 | — | — | .16 |

The products of Example II are evaluated as shown below in Table III.

TABLE III

|  | A | B | C |
|---|---|---|---|
| FUSION TIME | 1.2 | 2.2 | 2.7 |
| TORQUE AT FUSION | 510.0 | 475.0 | 420.0 |
| TORQUE 10 MIN. AFTER FUSION | 400.0 | 405.0 | 395.0 |
| CROSS LINKING TIME | 25.0 | 27.5 | 29.0 |
| STABILITY TIME | 23.7 | 25.3 | 26.3 |

The fusion time test indicates that product C is superior to comparative products A and B in that the longer the fusion time the more effective the external lubricating properties of the lubricant compound in the extrusion die.

The stability time for product C is also superior to products A and B. The stability time measured in minutes shows the color development to the same point of degradation of the PVC resin. That is, the PVC resin tends to become dark when dehydrohalogenation occurs.

The maximum torque at fusion measured in meter/grams indicates that product C has a lower torque at fusion. The lower the torque at fusion the more external the lubricant and therefore the more effective the lubricant is when compared at equal levels. In the present case it is noted that the MF-200 lubricant was tested at a level of 1/5 the amount of the stearyl stearamide product and is more effective even when used at 1/5 the level. Product C is also more effective as an external lubricant than product B using the polyethylene compound at equivalent concentrations. It was previously noted that it was desirable to minimize the amount of an amide lubricant utilized as the amide lubricants tend to oxidize and to cause dehydrohalogenation of the product. Therefore product C when used on an equivalent level is more effective and is not observed to cause the dehydrohalogenation. The polyethylene lubricants are observed to breakdown due to oxidation during the extrusion process. Therefore, these products become less effective over a period of time in the mold whereas this effect is not observed with product C.

The cross linking time also shows product C to be superior. The cross linking occurs after the dehydrohalogenation and is accounted for by the double bonds within the molecules which are formed after dehydrohalogenation cross linking with one another. A consequential increase in melt viscosity occurs and this state is observed in a PVC resin by a darkening of the product due to the carbon-carbon bond formation. A secondary increase in melt viscosity will also be observed at this point as the products become more viscous when the carbon-carbon double bond is converted to a carbon-carbon cross link bond. Overall, the product according to the invention (C) shows superior external lubricant properties.

What is claimed is:

1. A process for preparing shaped articles of polyvinylchloride including the steps of:
   (a) obtaining polyvinylchloride in an unshaped form;
   (b) mixing into component (a) a sufficient amount of

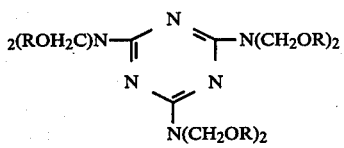

where R is an alkyl group having from 6 to 32 carbon atoms to provide a lubricating effect;
   (c) passing the mixture of (a) and (b) through an extrusion die; and,
   (d) obtaining the shaped article from the die.

2. The process of claim 1 wherein the weight ratio of component (b) to component (a) is from about 1/10,000:1 to about 1/100:1.

3. The process of claim 1 containing as an additional ingredient a fatty acid ester of a fatty alcohol.

4. The process of claim 3 wherein the weight ratio of the fatty acid-fatty alcohol ester is to component (b) is from about 10:1 to about 1:4.

5. The process of claim 1 wherein R is an alkyl group having from about 12 to about 20 carbon atoms.

6. The process of claim 4 wherein the weight ratio of the fatty acid-fatty alcohol ester to component (b) is from about 8:1 to about 1:2.

7. The process of claim 1 wherein R is a saturated moeity.

8. The process of claim 7 where R is stearyl.

9. The process of claim 4 wherein the fatty acid-fatty alcohol ester is a mixture of cetyl, myristyl, stearyl stearates and palmitates.

10. A polyvinylchloride composition comprising:
    (a) polyvinylchloride in an unshaped form; and,
    (b) a lubricating amount

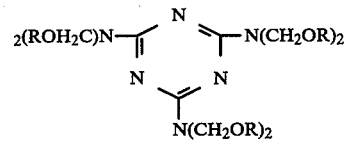

where R is an alkyl group having from 6 to 32 carbon atoms.

11. The composition of claim 10 containing as an additional ingredient a fatty acid ester of a fatty alcohol wherein the weight ratio of said ester to component (b) is from about 10:1 to about 1:4.

12. The composition of claim 11 wherein said ester is a mixture of cetyl, myristyl, stearyl stearates and palmitates.

* * * * *